No. 792,537. PATENTED JUNE 13, 1905.
F. M. MULLIGAN.
CHURN FEEDING APPARATUS.
APPLICATION FILED MAR. 3, 1905.
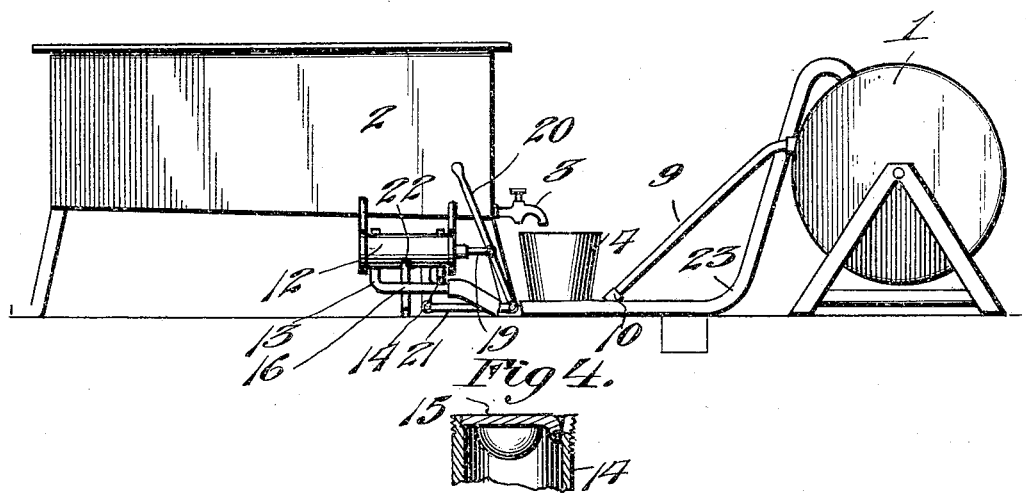
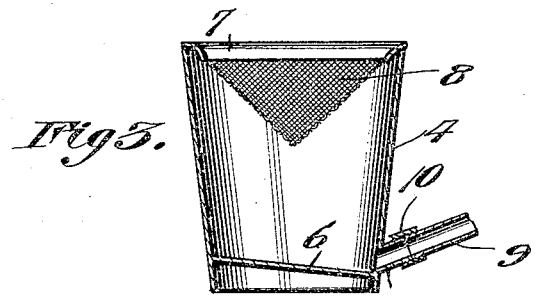
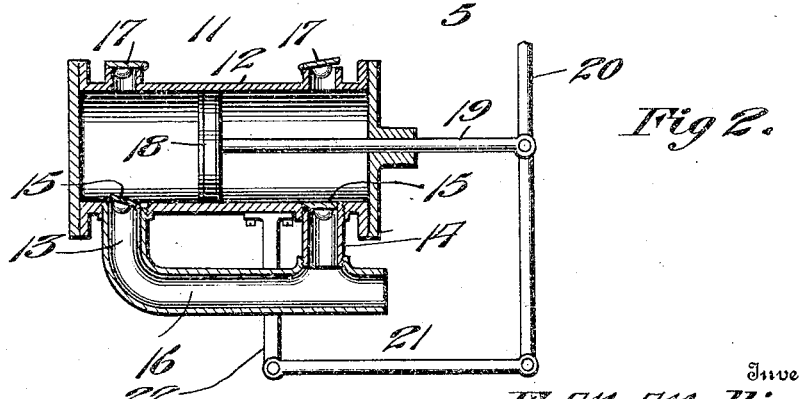
Inventor
F. M. Mulligan
Witnesses
Phil. E. Barnes.
C. C. Hines.
By Victor J. Evans
Attorney No. 792,537. Patented June 13, 1905.

UNITED STATES PATENT OFFICE.

FRANCIS M. MULLIGAN, OF EYOTA, MINNESOTA.

CHURN-FEEDING APPARATUS.

SPECIFICATION forming part of Letters Patent No. 792,537, dated June 13, 1905.

Application filed March 3, 1905. Serial No. 248,309.

*To all whom it may concern:*

Be it known that I, FRANCIS M. MULLIGAN, a citizen of the United States, residing at Eyota, in the county of Olmsted and State of Minnesota, have invented new and useful Improvements in Churn-Feeding Apparatus, of which the following is a specification.

This invention relates to churn-feeding apparatus, and has for its object to provide means whereby a churn may be supplied from a vat or other reservoir with the cream to be churned into butter in a simple, convenient, and expeditious manner.

The preferred embodiment of the invention is illustrated in the accompanying drawings, in which—

Figure 1 is a side elevation of a churn and feeding apparatus embodying my invention, a portion of the exhaust tube or pipe being broken away to more clearly show the pump-actuating mechanism. Fig. 2 is a longitudinal section of the exhaust-pump. Fig. 3 is a central vertical section of the cream-receiving pail or vessel. Fig. 4 is a detail sectional view showing the construction of one of the valves of the pump.

Referring now more particularly to the drawings, the numeral 1 represents a churn, and 2 a cream tank or reservoir, which may be of any preferred form and construction. The tank 2 is provided at its delivery end with a discharge-faucet 3.

Arranged below the faucet 3 is a cream-pail or receiving vessel 4, provided at or near its lower end with a discharge-outlet 5 and having its bottom 6 inclined toward said outlet, so as to facilitate the discharge of the cream therethrough. Removably supported upon the top of the vessel is an annular rim 7, provided with a depending inverted conical strainer 8. The pail is arranged immediately below the faucet 3, so that the cream discharging from the vat 2 through said faucet will descend into the strainer 8 and be relieved of any foreign substances that may be contained therein and thence passed in a strained condition to the interior of the pail.

The pail 4 is connected with the churn 1 through the medium of a cream-supply pipe 9, which is connected at one end to the outlet 5 by a coupling 10. At its upper end the pipe 9 may be connected with the churn in any approved manner and is in open communication therewith.

Suitably supported upon or alongside the tank 2 is a double-acting exhaust-pump 11, the cylinder 12 of which is provided with the usual inlet-passages 13 and 14 and hinged or pivoted inlet-valves 15, the said passages 13 and 14 being connected to a common inlet-pipe 16. The cylinder is further provided with the usual hinged or pivoted outlet-valves 17, disposed opposite the valves 15 and through which the air entering said cylinder exhausts to the atmosphere. The piston 18 of the pump is provided with a rod or stem 19, extending exteriorly through one of the heads thereof and pivotally connected at its outer end to an operating hand-lever 20, jointed by a link or connecting member 21 to a bracket or other suitable support 22, pendent from the cylinder 12. The inlet-pipe 16 is in communication with one end of an air-exhaust pipe 23, which is connected at its opposite end with the churn 1 and is in open communication therewith. Preferably this pipe consists of an ordinary rubber or composition tube or hose which fits air-tight at its delivery end upon the end of the inlet-pipe 16, so that it may be detached therefrom when occasion requires.

In the operation of the device the faucet 3 is opened to allow cream to flow from the tank 2 to the receiving pail or vessel 4 until the latter is filled to the desired height, and then the faucet 3 is closed and the lever 20 operated to set the piston 18 in motion, whereby the air contained within the churn 1 will be exhausted therefrom, thus causing the contents of the pail 4 to be drawn by suction into the churn-body. As soon as the cream begins to feed from the pail 4 in the manner described the faucet 3 is opened and the cream allowed to pass from the vat into the pail to feed continuously from the latter to the churn until the churn is filled or supplied to the desired extent. The operation of churning may then be proceeded with in the customary manner for the production of butter.

In practice the pipe 9 is detachably connected with both the pail or vessel 4 and the churn-body in order that it may be detached after the churn has been supplied with cream in order to enable it and the vessel 4 to be conveniently cleansed.

It will be observed that the strainer 8 is removably mounted upon the pail-body, so that it may be conveniently detached for cleansing purposes, thus enabling the parts of the appliance to be quickly and conveniently cleansed with thoroughness after they have been used.

From the foregoing description, taken in connection with the accompanying drawings, the construction, mode of operation, and advantages of the invention will be readily understood without a further extended description.

Changes in the form, proportions, and minor details of construction may be made within the scope of the invention as defined by the appended claims without departing from the spirit or sacrificing any of the advantages thereof.

Having thus fully described the invention, what is claimed as new is—

1. In a feeder for churns, the combination of a cream-holder provided with a discharge-faucet, a churn, a cream-receiving vessel having an open end disposed below said faucet and adapted to receive the cream discharged therefrom, said vessel also having an outlet and an inclined bottom leading thereto, a rim superposed upon the open end of the receiving vessel and provided with a strainer pendent therefrom, means for exhausting air from the churn, and a delivery-pipe detachably connected with the churn and the outlet of the receiving vessel, substantially as described.

2. In a churn-feeder, the combination of a cream-holder, a churn, means for conveying the cream from said holder to the churn, a vacuum-pump disposed alongside the cream-holder and provided with an inlet, a pipe connecting said inlet with the churn, a hanger carried by the pump-cylinder, an operating-lever connected with the pump-piston, and a link connecting said lever with the hanger, substantially as described.

3. In a churn-feeder, the combination of a cream-holder provided with a discharge-outlet, a churn, an air-exhaust pump connected with the churn, a receiving vessel disposed adjacent the said discharge-outlet and adapted to receive cream therefrom, and a cream-supply pipe detachably connected with said vessel and with the churn.

In testimony whereof I affix my signature in presence of two witnesses.

FRANCIS M. MULLIGAN.

Witnesses:
H. E. SMITH,
W. W. NEWLAND.